Nov. 5, 1968 R. HATSCHEK 3,409,754
ELECTRICAL RESISTANCE-WELDING PROCESS FOR PIEZOELECTRIC
DYNAMOMETERS, PARTICULARLY FOR
PRESSURE TRANSDUCERS
Filed May 26, 1964
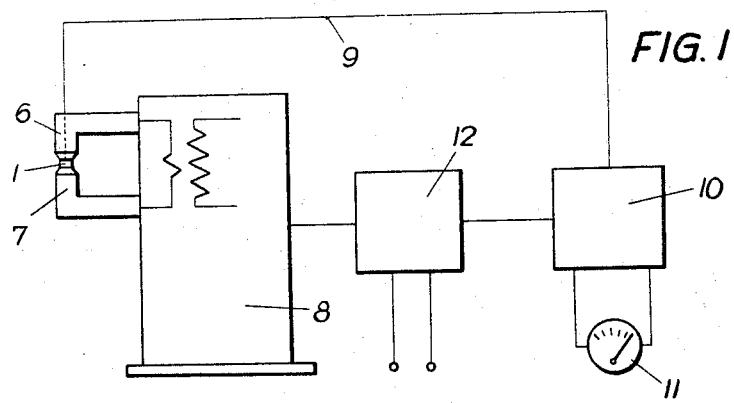
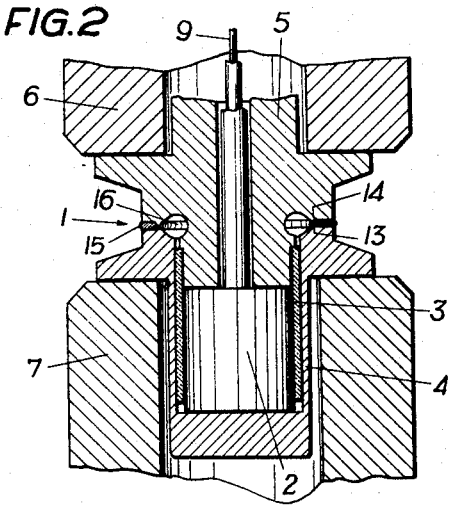
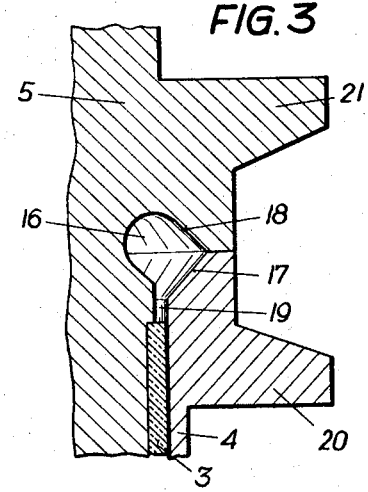
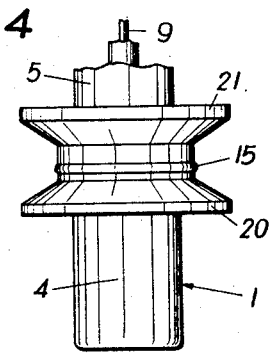
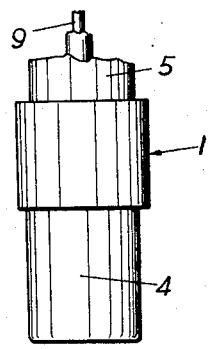
Inventor
Rudolf Hatschek
By
Watson, Cole, Grindle & Watson
Attys.

United States Patent Office 3,409,754
Patented Nov. 5, 1968

3,409,754
ELECTRICAL RESISTANCE-WELDING PROCESS FOR PIEZOELECTRIC DYNAMOMETERS, PARTICULARLY FOR PRESSURE TRANSDUCERS
Rudolf Hatschek, Vienna, Austria, assignor to Hans List, Graz, Austria
Filed May 26, 1964, Ser. No. 370,253
Claims priority, application Austria, May 28, 1963, A 4,318/63
2 Claims. (Cl. 219—86)

ABSTRACT OF THE DISCLOSURE

A piezoelectric dynamometer in which a prestressing sleeve and a connector are joined together with their annular rims and then inserted for welding between hollow electrodes of a resistance welding apparatus with the prestress of the piezoelectric element being continuously measured and used to control the welding operation by terminating the welding current upon the attainment of a predetermined amount of prestress.

The invention relates to an electrical resistance-welding process for piezoelectric dynamometers, particularly for piezoelectric pressure transducers, comprising a prestressing sleeve enclosing the piezoelectric element and a connector welded thereon. The piezoelectric elements of similar pressure transducers generally consist of a quartz system clamped between electrodes and releasing an electric charge the amount of which depends on the compressive stress to which the quartz is subject. These signals are boosted and preferably transmitted to a measuring instrument, a cathode-ray oscillograph or any other indicator gauge registering the pressure variations to which the pressure transducer is subject. In order for the pressure transducer to operate in a linear direction, it is necessary to prestress the piezoelectric element, thereby eliminating or cancelling the effect of the inevitable apertural elasticity of the contact surfaces of the quartz system and the electrodes even where these surfaces are neatly polished, the said apertural elasticity being an imponderable factor liable to affect the accuracy of measurements. In other to preclude each and every insecurity factor affecting the result of the measurements and to be able to use the pressure transducer also for pressure ranges below atmospheric, the piezoelectric elements are usually prestressed more than would be necessary to eliminate apertural elasticity. For the purpose of obtaining identical measurements over the entire pressure range by means of serially produced pressure transducers of the same type, all piezoelectric elements should possibly be prestressed to the same extent. These requirements are very difficult to meet in the actual manufacturing process, particularly in small-sized and miniature pressure transducers of the type generally used for example, for measuring the pressure distribution in the cylinders of internal combustion engines.

At present, two conventional processes are chiefly used for the prestressing of piezoelectric pressure transducers. According to one of these processes, the prestressing sleeve presenting an extension at the connection-end and a female thread and a counterpart having a male thread to match, are so tensioned in relation to each other by means of a torque wrench that the piezoelectric element clamped between the prestressing sleeve and its counterpart is given the required amount of prestress. Since friction between the threads as well as the condition of the torque wrench used present instability factors almost impossible to ascertain, the conventional process permits only relatively coarse prestressing of the piezoelectric elements without the possibility of attaining a reasonable degree of similarity between individual measurements taken by pressure transducers of the same type.

According to a second conventional process the prestressing sleeve and its counterpart are provided with flanges at their junction and are of a predetermined undersize as compared with the inserted piezoelectric elements. Consequently, contact between the flanges is established only when the prestressing sleeve and its counterpart are pressed against each other by external pressure, the amount of prestress applied to the piezoelectric elements depending solely on the aforesaid undersize, that is, on the degree of precision to which the prestressing sleeve, its counterpart and the piezoelectric element have been machined. Apart from the fact that the required high degree of accuracy to size of these parts requires extreme precision for the finishing process and consequently involves considerable costs, an additional element has to be provided for the stressing of the prestressing sleeve and its counterpart, such as by flanging. Positive and accurate setting of the required degree of prestress is not possible with this process either.

It is the object of the invention to eliminate these drawbacks of conventional processes and to permit the assembling of piezoelectric pressure transducers in conjunction with the accurate setting of the required prestress. The process according to the invention consists in centering the prestressing sleeve and the connector in relation to each other preferably by means of an insulating bushing, assembling them with narrow annular joints and subsequently welding them between the hollow electrodes of an electronically controlled resistance-welding apparatus with electrode force control, the prestressing of the piezoelectric element being continuously measured by means of a measuring instrument connected to the piezoelectric element. The welding operation is terminated only as soon as a predetermined amount of prestress has been reached in the piezoelectric element and, preferably automatically by the action of the electric measure corresponding to the required prestress upon the electronic control of the resistance-welding apparatus.

Since the prestress of the piezoelectric element is directly measured by the latter itself, there is no difficulty in presetting the required prestress with a high degree of accuracy. This is particularly advantageous for the serial assembly of piezoelectric pressure transducers as it ensures accurate identity of prestresses and consequently, of the measurements of the individual pressure transducers. The precision of the process according to the invention can be further increased by automatic control of the welding operation as individual influences are thereby eliminated. Furthermore, the operation of the welding apparatus is considerably simplified.

According to another feature of the invention, the prestressing sleeve and the connector are made with large-area annular flanges adjoining the front faces of the hollow electrodes during the welding operation and jointly turned and polished to measure after the welding. Thus heating of the elements to be welded together in the areas of contact with the electrodes is avoided and the free passage of the current assured so that heating is permanently restricted to the area of the welding seam. This provides a completely tight and uniform welding joint between the prestressing sleeve and the connector. The pressure transducer is given its final space-saving shape by subsequent machining. Pressure transducers manufactured by this process are therefore, particularly suitable for use in confined spaces.

Further details of the invention will appear from the following description of an embodiment of the invention with reference to the accompanying drawing in which:

FIGURE 1 schematically shows the arrangement of the equipment required for performing the process according to the invention;

FIGURE 2 is an axial cross-sectional view of a pressure transducer insert welded by the process according to the invention and clamped between hollow electrodes;

FIGURE 3 is a partially axial cross-sectional view of the area of the welding seam prior to the performance of the process according to the invention on an enlarged scale;

FIGURE 4 is an elevation of the pressure transducer insert after the welding; and FIGURE 5 is an elevation of the finished pressure transducer as shown in FIGURE 4.

The pressure transducer insert 1 of FIGURE 4 is inserted between the hollow electrodes 6 and 7 of an electronically controlled resistance-welding apparatus 8 with an adjustable electrode force. The piezoelectric element of the pressure transducer insert 1 is connected via a measuring line 9 with a piezoelectric amplifier 10 to which a measuring instrument 11 is connected. Via a control line, the piezoelectric amplifier 10 is connected with the electronic control 12 of the resistance-welding apparatus 8.

The pressure transducer insert 1 comprises a cylindrical piezoelectric element 2, preferably a quartz unit, the shell of which is surrounded by an insulating bushing 3 and inserted jointly with the latter in a prestressing sleeve 4 closed on one side. In coaxial relation to the prestressing sleeve 4 an axially perforated connector 5 adjoins the free extremity of the said prestressing sleeve, the measuring line 9 of the piezoelectric element emerging from the bore of the said connector. The prestressing sleeve 4 and the connector 5 adjoin each other with their narrow annular joints 13, 14. In the zone within these joints 13, 14 annular recesses, jointly defining the annular chamber 16 are provided in the prestressing sleeve 4 and in the connector 5. The walls of the annular chamber 16 present oblique surfaces 17 of identical inclination in relation to the joints 13, 14. The purpose of this design will be more fully explained hereafter. An annular gap 19 is provided between the prestressing sleeve 4 and the connector 5. The top of the insulating bushing 3 protrudes in said gap, centering the prestressing sleeve 4 and connector 5 in relation to each other. The latter elements are provided with large-area annular flanges 20, 21 resting during the welding operation on the front ends of the hollow electrodes 6, 7 of the welding apparatus 8.

The process according to the invention is performed in the following manner:

After the piezoelectric element 2 and the insulating bushing 3 have been inserted in the prestressing sleeve 4, the connector 5 with its cylindrical extension is introduced in the insulating bushing 3 until contact between the narrow annular joints 13 and 14 of the prestressing sleeve 4 and connector 5 is established. Now the hollow electrodes 6, 7 of the resistance-welding apparatus 8, one of which is displaceable alongside a parallel guiding means by means of a pneumatic operating cylinder, are moved away from each other far enough for the pre-assembled pressure transducer insert 1 to be installed in between. Thereupon the measuring line 9 of the piezoelectric element 2 is connected to the piezoelectric amplifier 10. Then the hollow electrodes 6 and 7 are brought closer together by means of the pneumatic adjusting device so that their front ends come into contact with the annular flanges 20 and 21 of the pressure transducer insert 1. Thereupon the resistance-welding apparatus 8 is started and the electrodes 6 and 7 are pressurized by means of the pneumatic adjusting device. As a result of the substantial passage of current at the narrow angular joints 13, 14 the material located at this point is heated until it reaches the state of fusion. During the welding operation the prestressing sleeve 4 and the connector 5 are brought still closer together due to the pressure exerted by the electrodes, so that the piezoelectric element 2 inserted between these two parts is increasingly prestressed. The amount of this prestress is recorded by the measuring instrument 11. At the same time, the signal boosted by the piezoelectric amplifier 10 is transmitted to the electronic control which switches the welding transformer of the resistance-welding apparatus 8 off as soon as a predetermined prestress has been attained. After the welding, the hollow electrodes 6 and 7 remain under pressure for a short while, whereupon they are opened by means of the pneumatic adjusting device and the pressure transducer insert 1 is free for further processing. During the cooling of the welded pressure transducer insert 1 the prestress of the piezoelectric element 2 is slightly altered, the said alteration being determined empirically. This alteration should be taken into account when determining the required amount of prestress.

Upon completion of the welding of the pressure transducer insert 1, the annular flanges 20 and 21 are turned in one operation, the cylindrical shell of the pressure transducer insert 1 thus produced being polished to measure by a further operation (FIGURES 4 and 5).

The geometrically correct design of the prestressing sleeve 4 and of the connector 5 in the area of their joints 13, 14 is essential for the successful performance of the welding operation. The afore-mentioned design of the annular chamber 16 with oblique surfaces 17 and 18 of identical inclination in relation to the plane of contact ensures the uniform increase of the cross-section of the material above and below the welding seam 15.

This affords symmetrical heat abduction, the hottest spot remaining close to the welding seam. In addition, the annular chamber 16 also serves to receive metal drops and condensate. These foreign bodies and/or impurities are prevented from penetrating through the annular centering gap 19 adjoining the annular chamber 16 as far as the piezoelectric element 2 by the insulating bushing 3 located inside the said gap.

The process according to the invention is suitable for use in conjunction with piezoelectric dynamometers of every description and is in no ways restricted to the embodiment hereabove described by way of example.

I claim:

1. A device for the manufacture of a piezoelectric dynamometer having a piezoelectric element, comprising an insulating bushing encompassing the piezoelectric element, a cup-shaped prestressing sleeve encompassing the said insulating bushing and having a narrow annular rim at its open end, a connector having a narrow annular rim, the prestressing sleeve and the connector being joined together with their narrow annular rims and subsequently inserted for welding between two hollow electrodes of an electronically controlled resistance-welding apparatus having an adjustable electrode, the mechanical prestress of the said piezoelectric element being continuously measured by means of the said piezoelectric element, the resistance-welding apparatus being switched off by the electronic control only when a predetermined amount of mechanical prestress has been attained.

2. A device as claimed in claim 1, wherein the said prestressing sleeve and the said connector each are cast integral with their respective large-area annular flanges, both the prestressing sleeve and the connector with their respective flanges being subsequently placed upon the faces of two hollow electrodes and welded together, whereupon the said flanges are turned jointly and the prestressing sleeve together with the connector are finished to size.

References Cited

UNITED STATES PATENTS 1,847,890  3/1932  Osborne _____ 219—89
2,797,303  6/1957  Kershaw _____ 219—117

RICHARD M. WOOD, *Primary Examiner.*

P. W. MAY, *Assistant Examiner.*